T. J. FEGLEY.
CHUCK.
APPLICATION FILED SEPT. 2, 1909.
952,320.
Patented Mar. 15, 1910.
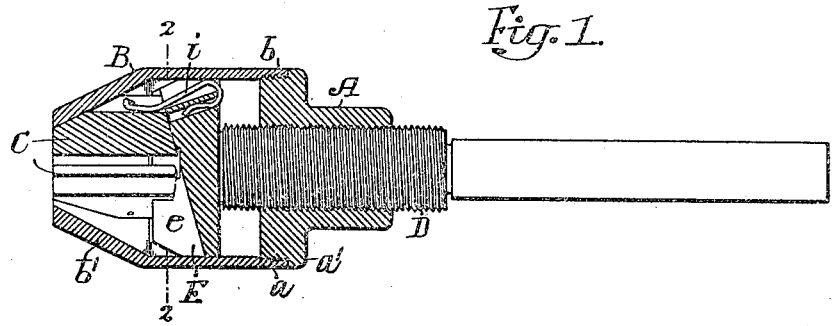
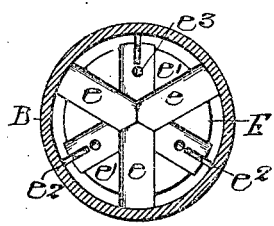
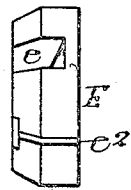
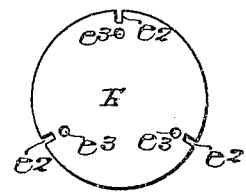
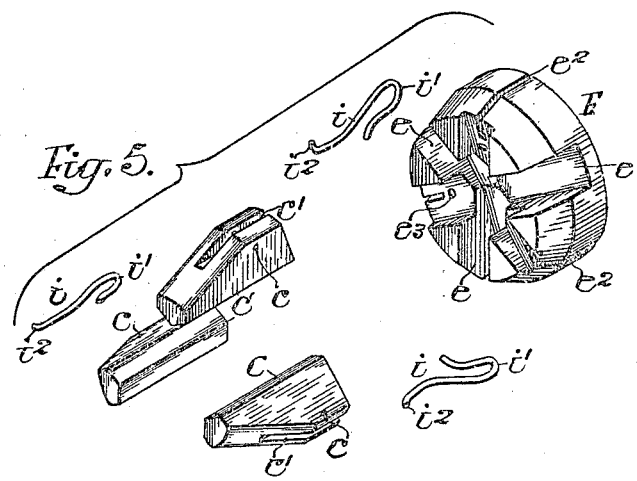
Witnesses:—
Willa A. Burrowes
Walter Chism
Inventor:—
Thomas J. Fegley.
by his Attorneys,—

UNITED STATES PATENT OFFICE.

THOMAS J. FEGLEY, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

CHUCK.

952,320.  Specification of Letters Patent.  Patented Mar. 15, 1910.

Application filed September 2, 1909. Serial No. 515,789.

*To all whom it may concern:*

Be it known that I, THOMAS J. FEGLEY, a citizen of the United States, residing in Philadelphia, Pennsylvania, have invented certain Improvements in Chucks, of which the following is a specification.

One object of my invention is to so construct a chuck that it can be accurately and economically manufactured, and in which the jaws will be moved parallel with each other.

A further object of the invention is to so construct a chuck of the three jaw type that the carrier will not only support the rear end of the jaws, but will guide them in their movement toward and from each other.

A still further object of the invention is to make the carrier grooved to such an extent that the chuck will clear itself of any loose material entering between the jaws.

These objects I attain in the following manner, reference being had to the accompanying drawing, in which,—

Figure 1, is a longitudinal sectional view of my improved chuck; Fig. 2, is a transverse sectional view on the line 2—2 Fig. 1; Fig. 3, is a side view of the carrier; Fig. 4, is a rear view of the carrier, and Fig. 5, is a perspective view of the carrier, the jaws and the jaw springs.

A is the body portion having, in the present instance, a screw threaded section $a$, and a shoulder $a'$ at the rear and B is the shell having a screw threaded portion $b$ adapted to the threaded portion $a$ of the body A. When the shell is secured in place it rests against the shoulder $a'$ on the body portion. The outer end $b'$ of the shell is tapered at such an angle that when the jaws C are forced against it they will be moved toward the center.

D is a screw threaded stem on which the body portion A is mounted, the body portion having a central screw threaded orifice to which the stem is adapted.

E is a carrier made in a single piece and mounted within the shell B, the carrier in the present instance has three grooves $e$, which cross each other at the center and the base of each groove is beveled, as shown in Fig. 1, and the inner end of each jaw C has a corresponding bevel. The side walls $e'$ of the carrier hold the jaws in proper alinement so that they cannot move laterally to any great extent. The end of the stem D bears against the rear of the carrier, as shown in Fig. 1, and on turning the stem in the body portion A it forces the carrier forward, causing the jaws C to slide on their inclined surfaces toward the center of the chuck. Springs $i$, which are attached to the carrier and to each jaw, tend to force the jaws out against their bearing surfaces as soon as the carrier is released, by backing off the stem, thus the jaws open and close on the movement of the stem D within the body portion A. In the present instance each spring $i$ is made with a hooked end $i'$ and the carrier is slotted at $E^2$ and perforated at $e^3$, Fig. 4, to receive the hooked portion $i'$ of the spring. The outer end $i^2$ of each spring is bent outward and engages a pin $c$ which extends across a slot $c'$ in each jaw C, and the springs are so bent that they tend to move the jaws away from the center as soon as they are released.

It will be noticed by the above construction that the chuck can be readily manufactured and assembled, and that the beveled slots extending past the center of the carrier prevent the accumulation of any chips, which would prevent the proper opening and closing of the jaws. Furthermore, by making the carrier as shown, the slots can be readily milled, thus this element of the chuck can be cheaply manufactured.

I claim:

1. The combination in a chuck, of a body portion, a shell secured to the body portion and having a tapered outer end, a screw threaded stem adapted to a threaded opening in the body portion, a loose carrier adapted to slide within the shell, and to be acted upon by the stem, three inclined grooves in the face of the carrier, a jaw mounted in each groove and held laterally by the side walls of the grooves, springs tending to force the jaws out against the shell, the ends of the jaws being beveled on the same incline as the end of the shell.

2. The combination in a chuck, of a body portion, a shell secured to the body portion and having a tapered end, a screw stem adapted to a threaded opening at the center of the body portion and extending through said body portion, a carrier fitting the shell and acted upon by the end of the screw stem, said carrier having three inclined grooves in its face, said grooves crossing each other at the center, three jaws, each jaw fitting a groove in the carrier and held in position by the side walls of the groove, the jaws being beveled at each end, springs secured to the carrier and engaging the jaws and tending to draw the jaws away from the center of the chuck.

3. In a chuck, a jaw carrier having three inclined grooves in its face for the reception of the jaws, said grooves crossing each other at the center.

In testimony whereof, I have signed my name to this specification, in the presence of two subscribing witnesses.

THOMAS J. FEGLEY.

Witnesses:
  WM. E. SHUPE,
  WM. A. BARR.